US008416258B2

(12) United States Patent
Lin et al.

(10) Patent No.: US 8,416,258 B2

(45) Date of Patent: Apr. 9, 2013

(54) METHOD FOR ADJUSTING THE COLOR OF IMAGES

(75) Inventors: Shih-Chieh Lin, Taipei County (TW); Pei-Lin Hsieh, Taoyuan County (TW); Yu-Hung Li, Taoyuan County (TW); Hsiang-Tan Lin, Keelung (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 407 days.

(21) Appl. No.: 12/796,821

(22) Filed: Jun. 9, 2010

(65) Prior Publication Data

US 2011/0193877 A1 Aug. 11, 2011

(30) Foreign Application Priority Data

Feb. 8, 2010 (TW) ............................... 99103794 A

(51) Int. Cl.
*G09G 5/02* (2006.01)
*G06K 9/00* (2006.01)

(52) U.S. Cl.
USPC ........... 345/603; 345/589; 345/590; 382/162; 382/163; 382/167

(58) Field of Classification Search ........................ None
See application file for complete search history.

(56) References Cited

U.S. PATENT DOCUMENTS 5,222,206 A * 6/1993 Liao .............................. 345/592
7,733,353 B2 * 6/2010 Edge .............................. 345/589
7,949,183 B2 * 5/2011 Levy et al. .................... 382/167
8,059,913 B2 * 11/2011 Kwon et al. .................. 382/274
2007/0121180 A1 5/2007 Ogawa
2009/0290068 A1 * 11/2009 Abe et al. ...................... 348/649

FOREIGN PATENT DOCUMENTS

JP 2003250058 9/2003

OTHER PUBLICATIONS

Pei-Lin Hsieh, Yu-Hung Li, Shih-Chieh Lin, Hsiang-Tan Lin, Multi-Axis-Adjusted System for Color Reproduction, IMID 2009 Digest, Oct. 12-16, 2009, pp. 1554-1555, KINTEX, Seoul, Korea.

* cited by examiner

*Primary Examiner* — Kee M Tung
*Assistant Examiner* — Haixia Du
(74) *Attorney, Agent, or Firm* — WPAT PC; Justin King

(57) ABSTRACT

A method for adjusting the color of images is provided. In the method, firstly, an original hue-saturation-value (HSV) color coordinate is obtained from an original image signal. Next, the original HSV color coordinate is converted into an adjusted HSV color coordinate according to color adjusting data. Afterwards, the adjusted HSV color coordinate is converted into a corrected HSV color coordinate. Then, an output image signal is generated according to the corrected HSV color coordinate.

13 Claims, 4 Drawing Sheets

METHOD FOR ADJUSTING THE COLOR OF IMAGES

CROSS-REFERENCE TO RELATED APPLICATION

This application claims the benefit of Taiwan Patent Application No. 099103794, filed on Feb. 8, 2010, which is hereby incorporated by reference for all purposes as if fully set forth herein.

BACKGROUND OF THE INVENTION

1. Field of Invention

The present invention relates to a method for adjusting images, and more particularly to a method for adjusting the color of images.

2. Related Art

Color displays are widely used in the modern society, and recently, the color displays have various types, including not only large size displays such as television sets, computer monitors, and projectors, but also small size displays such as display screens of cell phones, personal digital assistants (PDAs), digital cameras, digital camcorders, handheld game consoles, or other portable electronic equipments. Recently, the color displays can not only display color images, but also adjust the color images according to preference of users.

SUMMARY OF THE INVENTION

The present invention is directed to a method for adjusting the color of images, and the method is capable of adjusting color images displayed by a color display.

The present invention provided a method for adjusting the color of images. The method applies to a color display having a color gamut. In the method, firstly, an original hue-saturation-value (HSV) color coordinate is obtained from an original image signal. Next, the original HSV color coordinate is converted into an adjusted HSV color coordinate according to color adjusting data. Afterwards, the adjusted HSV color coordinate is converted into a corrected HSV color coordinate. Then, an output image signal is generated according to the corrected HSV color coordinate.

Accordingly, the present invention may adjust color images displayed by a color display, so that the color display shows the color images favored by users.

In order to make the aforementioned features and advantages of the present invention comprehensible, embodiments accompanied with figures are described in detail below.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1A:
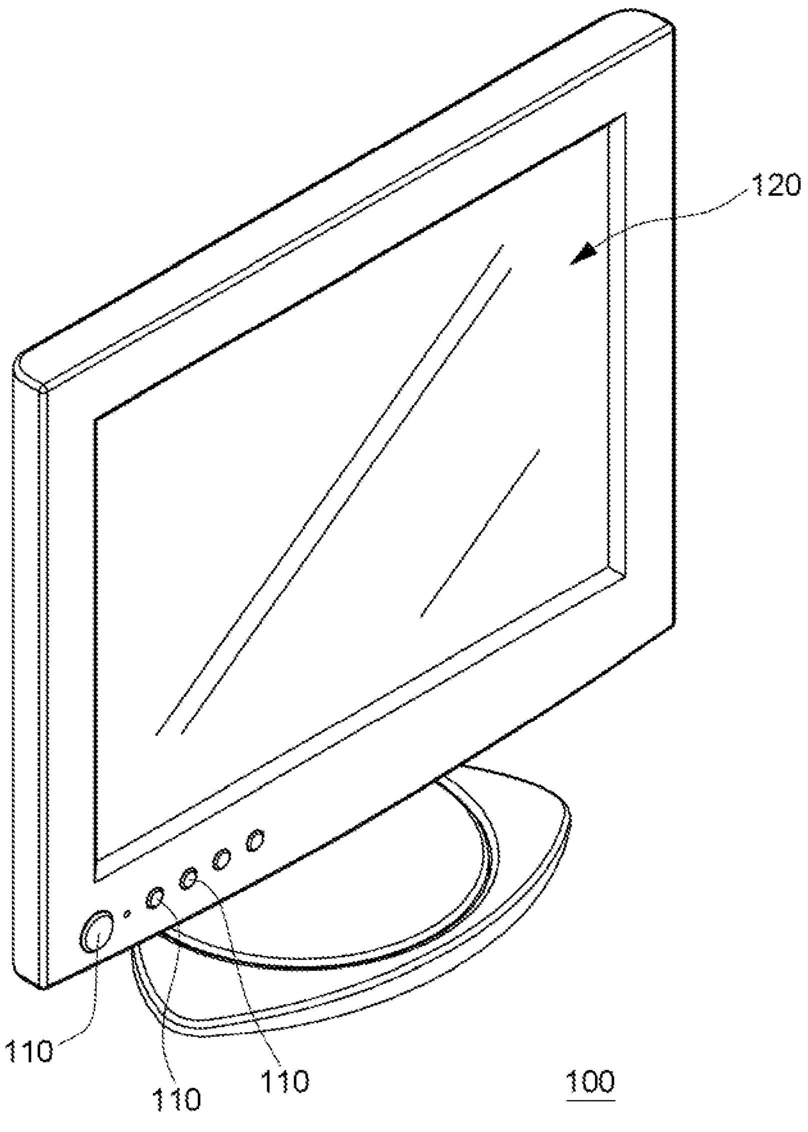
FIG. 1A is a schematic three-dimensional view of a color display to which a method for adjusting the color of images is applied according to an embodiment of the present invention.

FIG. 1A is a schematic three-dimensional view of a color display to which a method for adjusting the color of images is applied according to an embodiment of the present invention. Referring to FIG. 1A, the method for adjusting the color of images of this embodiment is applied to a color display 100, and the color display 100 may be a cathode ray tube (CRT) display or a thin display (as shown in FIG. 1A), in which the thin display is, for example, a liquid crystal display (LCD) or a plasma display.

In the embodiment as shown in FIG. 1A, the color display 100 is a computer monitor. However, in other not shown embodiments, the color display 100 may also be a large size display such as a television set or a projector, or a small size display such as a display screen of a cell phone, a PDA, a digital camera, a digital camcorder, a handheld game console, or other portable electronic equipments. The color display 100 includes a plurality of setting buttons 110 and a display screen 120. A user may adjust colors of images displayed by the color display 100 through the setting buttons 110.

Figure 1B:
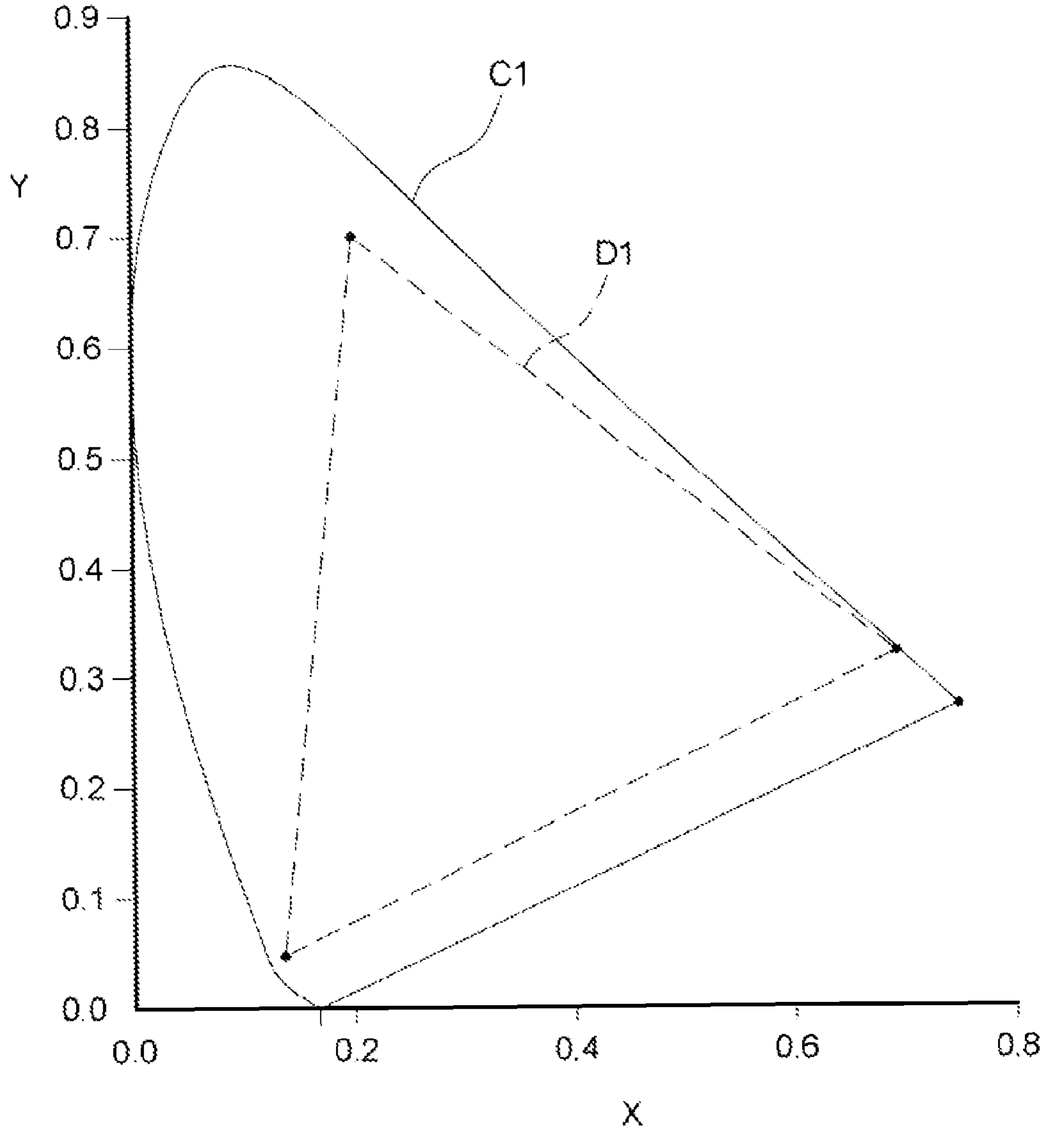
FIG. 1B is a schematic view of a color gamut of the color display in FIG. 1A.

FIG. 1B is a schematic view of a color gamut of the color display in FIG. 1A. Referring to FIGS. 1A and 1B, the color display 100 has a color gamut D1, and the color gamut D1 is located in a color space chromaticity diagram C1, in which the color space chromaticity diagram C1 may be a Commission internationale de l'éclairage (CIE) 1931 color space chromaticity diagram, a CIE 1960 color space chromaticity diagram, or a CIE 1976 color space chromaticity diagram, and the color gamut D1 may include an NTSC standard color gamut set by the National Television System Committee (NTSC).

Figure 2:
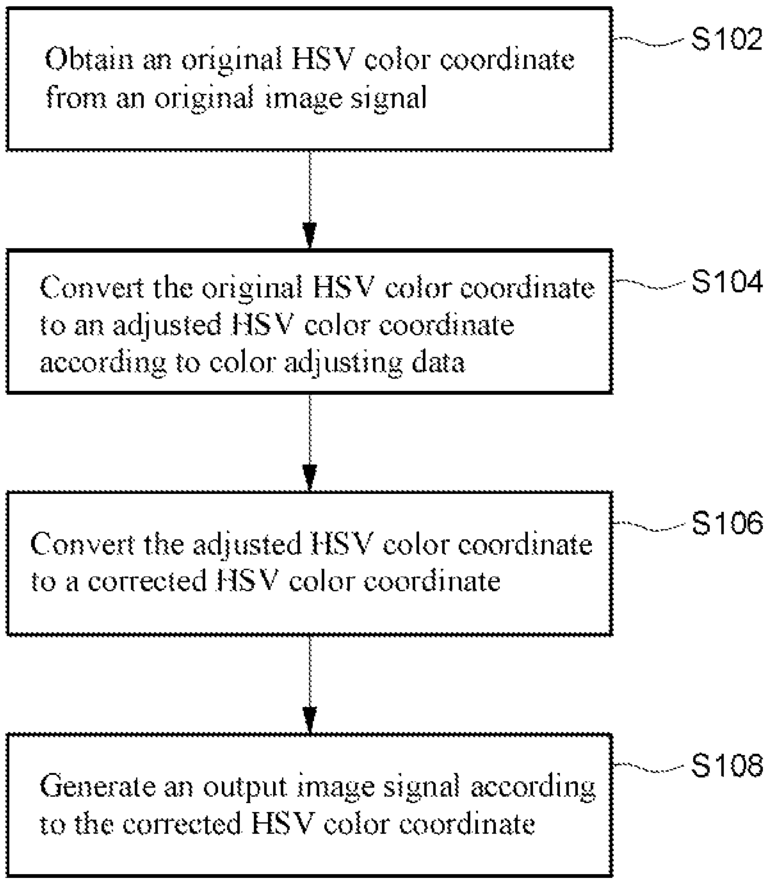
FIG. 2 is a schematic flow chart of a method for adjusting the color of images according to an embodiment of the present invention.

FIG. 2 is a schematic flow chart of a method for adjusting the color of images according to an embodiment of the present invention. Referring to FIGS. 1A and 2, the method for adjusting the color of images according to this embodiment includes the following steps. Firstly, Step S102 is performed, that is, an original hue-saturation-value (HSV) color coordinate is obtained from an original image signal. Particularly, the color display 100 receives the original image signal and obtains the original HSV color coordinate according to the original image signal.

The original HSV color coordinate is a coordinate in a hue-saturation-value color space (hereinafter referred to as HSV color space), such that the original HSV color coordinate includes a plurality of coordinate values. That is, the original HSV color coordinate includes an original hue value, an original saturation value, and an original brightness value.

The original image signal received by the color display 100 includes an original red-green-blue (RGB) color model value, in which the original RGB color model value is a group of parameter values in a red-green-blue color model (also called a three-primary-color mode, and hereinafter referred to as RGB color model), and a format of the original RGB color model value may be RGB signals in a 24-bit format, a 48-bit format, or any other formats.

Particularly, by taking the original RGB color model value in the 24-bit format as an example, the original RGB color model value is (r, g, b), in which r, g, and b are respectively parameter values of red, green, and blue. The minimum value of r, g, and b is zero, and the maximum value thereof is 255, that is, $0 \leqq r, g, b \leqq 255$.

The greater the parameter value of r, g, or b is, the nearer to red, green, or blue the color represented by the original RGB color model value is. For example, when (r, g, b) is (255, 0, 0), it indicates that the color represented by the original RGB color model value is red. Similarly, when (r, g, b) is (0, 0, 255), it indicates that the color represented by the original RGB color model value is blue.

The step of obtaining the original HSV color coordinate includes converting the original RGB color model value. That is, the original RGB color model value is converted into the original HSV color coordinate. The conversion belongs to a space conversion between the RGB color model and the HSV color space, and the space conversion method is disclosed in common textbooks on chromatics. Therefore, the method for converting the original RGB color model value into the original HSV color coordinate belongs to the conventional art known by those of ordinary skill in the art of the present invention, so the descriptions thereof may not be given herein again.

Referring to FIG. 2, after Step S102, Step S104 is performed, that is, the original HSV color coordinate is converted into an adjusted HSV color coordinate according to color adjusting data. The color adjusting data includes a hue weight value, a saturation weight value, and a brightness weight value. The method for generating the color adjusting data includes adjusting a monochrome parameter group, in which the hue weight value, the saturation weight value, and the brightness weight value are generated according to the monochrome parameter group.

The monochrome parameter group signifies parameter values of a single color. For example, the parameter values are parameter values of red, green, blue, magenta, yellow, or cyan, and the monochrome parameter group includes a monochrome hue value, a monochrome saturation value, and a monochrome brightness value. For example, when the monochrome parameter group includes red parameter values, the red parameter values include a red hue value, a red saturation value, and a red brightness value. Similarly, when the monochrome parameter group includes yellow parameter values, the yellow parameter values include a yellow hue value, a yellow saturation value, and a yellow brightness value.

However, the color adjusting data may also be generated by adjusting a plurality of monochrome parameter groups. For example, the method for generating the color adjusting data includes adjusting a red parameter group, a green parameter group, and a blue parameter group, that is, adjusting the red hue value, the red saturation value, and the red brightness value; adjusting a green hue value, a green saturation value, and a green brightness value; and adjusting a blue hue value, a blue saturation value, and a blue brightness value.

Definitely, the method for generating the color adjusting data may also include adjusting a magenta parameter group, a yellow parameter group, and a cyan parameter group, that is, adjusting a magenta hue value, a magenta saturation value, and a magenta brightness value; adjusting the yellow hue value, the yellow saturation value, and the yellow brightness value; and adjusting a cyan hue value, a cyan saturation value, and a cyan brightness value.

In addition, the color adjusting data may be generated by adjusting six monochrome parameter groups, namely, the red parameter group, the green parameter group, the blue parameter group, the magenta parameter group, the yellow parameter group, and the cyan parameter group. In other words, the method for generating the color adjusting data includes adjusting the monochrome hue values, the monochrome saturation values, and the monochrome brightness values of the red parameter group, the green parameter group, the blue parameter group, the magenta parameter group, the yellow parameter group, and the cyan parameter group.

Referring to FIGS. 1A and 2, the color adjusting data may be generated by the user adjusting an image setting of the color display 100. In detail, at least one monochrome parameter group (including the monochrome hue value, the monochrome saturation value, and the monochrome brightness value) can be displayed on the display screen 120 through an On-Screen Display (OSD) technique. The monochrome hue value, the monochrome saturation value, and the monochrome brightness value are adjusted according to preference of the user or built-in set values by pressing the setting buttons 110.

The adjusted HSV color coordinate and the original HSV color coordinate are both the coordinates in the HSV color space, such that the adjusted HSV color coordinate includes a plurality of coordinate values. Particularly, the adjusted HSV color coordinate includes an adjusted hue value, an adjusted saturation value, and an adjusted brightness value. The color adjusting data, the original HSV color coordinate, and the adjusted HSV color coordinate satisfy equations (1), (2), and (3) as follows:

$$H'=H+Wh \quad (1)$$

$$S'=S\times Ws \quad (2)$$

$$V'=V\times Wv \quad (3)$$

H is the original hue value, S is the original saturation value, and V is the original brightness value. H' is the adjusted hue value, S' is the adjusted saturation value, and V' is the adjusted brightness value. Wh is the hue weight value, Ws is the saturation weight value, and Wv is the brightness weight value. A value of the hue weight value Wh is between −30 degrees and 30 degrees, and both values of the saturation weight value Ws and the brightness weight value Wv are between 0 and 1.

It may be known from the above equations (1), (2), and (3) that the adjusted hue value H' is equal to the sum of the original hue value H and the hue weight value Wh, the adjusted saturation value S' is equal to the product of the original saturation value S and the saturation weight value Ws, and the adjusted brightness value V' is equal to the product of the original brightness value V and the brightness weight value Wv.

Referring to FIGS. 1B and 2, after Step S104, Step S106 is performed, that is, the adjusted HSV color coordinate is converted into a corrected HSV color coordinate, in which the corrected HSV color coordinate is a coordinate in the HSV color space, and the corrected HSV color coordinate includes a plurality of coordinate values, that is, a corrected hue value, a corrected saturation value, and a corrected brightness value.

In this embodiment, the corrected HSV color coordinate is converted from the adjusted HSV color coordinate according to the original saturation value. In detail, the adjusted HSV color coordinate and the corrected HSV color coordinate satisfy equations (4), (5), and (6) as follows:

$$H''=(1-Sm)\times H+Sm\times H' \quad (4)$$

$$S''=(1-Sm)\times S+Sm\times S' \quad (5)$$

$$V''=(1-Sm)\times V+Sm\times V' \quad (6)$$

H" is the corrected hue value, S" is the corrected saturation value, and V" is the corrected brightness value. Definitions of H, S, V, H', S', and V' in the equations (4), (5), and (6) are the same as the definitions in the equations (1), (2), and (3), so the descriptions thereof may not be given herein again. Sm is a saturation parameter, and the saturation parameter Sm is changed with the variation of the original saturation value S.

Figure 3A:
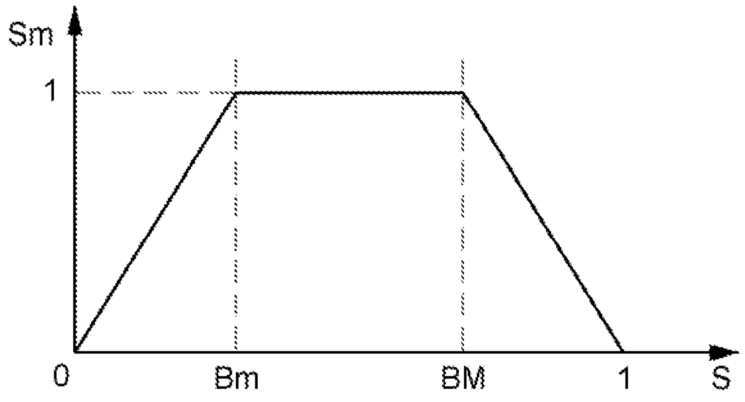
FIG. 3A is a curve diagram of original saturation values versus saturation parameters according to an embodiment of the present invention.

FIG. 3A is a curve diagram of original saturation values versus saturation parameters according to an embodiment of the present invention. Referring to FIGS. 2 and 3A, as shown in FIG. 3A, Bm is a first boundary value, and BM is a second boundary value. The first boundary value Bm and the second boundary value BM are two values of the original saturation value S, and the second boundary value BM is greater than the first boundary value Bm.

For example, in this embodiment, the second boundary value BM may be 0.7, and the first boundary value Bm may be 0.3. However, in other not shown embodiments, the first boundary value Bm and the second boundary value BM may be values except for 0.3 and 0.7. Hence, it is emphasized that the first boundary value Bm is not limited to 0.3, and the second boundary value BM is not limited to 0.7 in the present invention.

It may be known from the curve diagram as shown in FIG. 3A that the saturation parameter Sm and the original saturation value S satisfy equations (7), (8), and (9) as follows:

$$Sm \times Bm = S,\ \text{when } 0 \leqq S \leqq Bm \quad (7)$$

$$Sm = 1,\ \text{when } Bm \leqq S \leqq BM \quad (8)$$

$$Sm \times (BM-1) = S-1,\ \text{when } BM < S \leqq 1 \quad (9)$$

According to the above equations (4) to (9), when the original saturation value S of the original HSV color coordinate is a maximum value, that is, the original saturation value S is equal to 1, the saturation parameter Sm is equal to zero, so that the corrected hue value H", the corrected saturation value S", and the corrected brightness value V" are respectively equal to the original hue value H, the original saturation value S, and the original brightness value V.

Similarly, when the original saturation value S is a minimum value, that is, the original saturation value S is equal to 0, the saturation parameter Sm is also equal to zero, so that the corrected hue value H", the corrected saturation value S", and the corrected brightness value V" are respectively equal to the original hue value H, the original saturation value S, and the original brightness value V.

It is known from the above equations (4) to (9) that, when the original saturation value S of the original HSV color coordinate is the maximum value (that is, S=1) or the minimum value (that is, S=0), the original HSV color coordinate is the same as the corrected HSV color coordinate. In other words, during Step S106 that the adjusted HSV color coordinate is converted into the corrected HSV color coordinate, the original HSV color coordinate having the maximum saturation value or the minimum saturation value remains unchanged, such that a range of the color gamut D1 (as shown in FIG. 1B) remains unchanged.

In addition, it is known from FIG. 3A and the equations (7) and (9) that, a corresponding relation between the original saturation value S and the saturation parameter Sm is a linear relation. When the original saturation value S is between 0 and the first boundary value Bm, the saturation parameter Sm increases as the original saturation value S is increased. When the original saturation value S is between the second boundary value BM and 1, the saturation parameter Sm decrease as the original saturation value S is increased.

In addition to the corresponding relation between the original saturation value S and the saturation parameter Sm as shown in FIG. 3A, in other embodiments, another corresponding relation between the original saturation value S and the saturation parameter Sm further exists. For example, the first boundary value Bm is equal to the second boundary value BM, as shown in FIG. 3B.

Figure 3B:
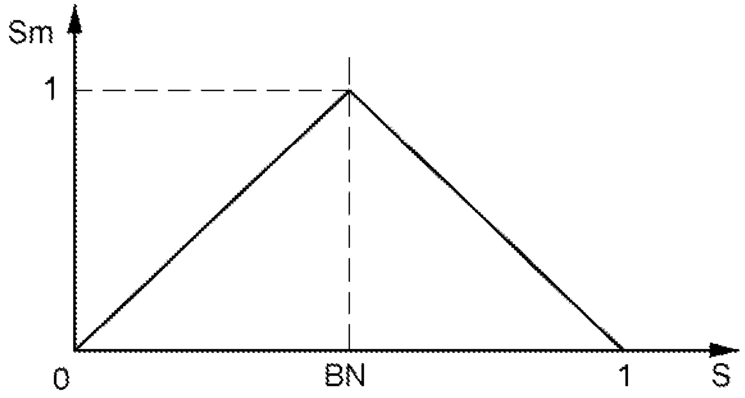
FIG. 3B is a curve diagram of original saturation values versus saturation parameters according to another embodiment of the present invention.

FIG. 3B is a curve diagram of original saturation values versus saturation parameters according to another embodiment of the present invention. Referring to FIG. 3B, in FIG. 3B, only one boundary value BN exists. It is known from FIG. 3B that the saturation parameter Sm and the original saturation value S satisfy equations (10) and (11) as follows:

$$Sm \times BN = S,\ \text{when } 0 \leqq S \leqq BN \quad (10)$$

$$Sm \times (BN-1) = S-1,\ \text{when } BN < S \leqq 1 \quad (11)$$

According to the equations (4), (5), (6), (10), and (11), when the original saturation value S of the original HSV color coordinate is a maximum value or a minimum value, the original HSV color coordinate is also the same as the corrected HSV color coordinate. Therefore, when Step S106 is performed, the saturation parameter Sm as shown in FIG. 3B may still keep the original HSV color coordinate having the maximum saturation value or the minimum saturation value unchanged.

Referring to FIGS. 1A and 2, after Step S106, Step S108 is performed, that is, an output image signal is generated according to the corrected HSV color coordinate, such that the color display 100 may display the color images on the display screen 120 according to the output image signal.

The output image signal includes an output RGB color model value, and the method for generating the output image signal includes converting the corrected HSV color coordinate into the output RGB color model value, in which the output RGB color model value is one group of parameter values in the RGB color model, and the format of the output RGB color model value is the same as the format of the original RGB color model value, such that the format of the output RGB color model value may be RGB signals in a 24-bit format, a 48-bit format, or any other formats.

In addition, the conversion between the corrected HSV color coordinate and the output RGB color model value also belongs to the space conversion between the RGB color model and the HSV color space, such that the method for converting the corrected HSV color coordinate into the output RGB color model value belongs to the conventional art known by those of ordinary skill in the art of the present invention, so the descriptions thereof may not be given herein again.

It should be noted that no matter in the embodiment as shown in FIG. 3A or 3B, the corresponding relation between the original saturation value S and the saturation parameter Sm is a linear relation. Therefore, when the color display 100 displays the color image according to the output image signal, the color image presents a color gradient effect in vision, that is, a color gradient region occurs between two neighboring color blocks in the color image. In this manner, when the user adjusts the image setting, a contour phenomenon is reduced, so as to avoid reducing the frame quality of the color image.

To sum up, the method for adjusting the color of images according to the present invention may adjust the color images displayed by the color display, so that the user may adjust the color images according to preference or built-in set values of the color display, and the color display shows the color images favored by the user.

Next, in the present invention, when the image color is adjusted, the range in the color gamut of the color display may not be changed, and the three primary colors (that is, red, green, and blue) of the color images displayed by the color display are not distorted, so as to ensure the color quality of the color display.

Further, in the process of adjusting the image color, the present invention can make the color images show the color gradient effect in vision, so as to prevent the contour phenomenon resulting from inappropriate adjustment of the color, thereby improving the frame quality of the color images.

Though the present invention has been disclosed above by the embodiments, they are not intended to limit the present invention. Anybody skilled in the art can make some modifications and variations without departing from the spirit and scope of the present invention. Therefore, the protection scope of the present invention falls in the appended claims.

What is claimed is:

1. A method for adjusting the color of images, applied to a color display having a color gamut, the method comprising:

obtaining an original hue-saturation-value (HSV) color coordinate from an original image signal;

converting the original HSV color coordinate into an adjusted HSV color coordinate according to a color adjusting data;

converting the adjusted HSV color coordinate into a corrected HSV color coordinate; and generating an output image signal according to the corrected HSV color coordinate;

wherein the color adjusting data comprises a hue weight value, a saturation weight value, and a brightness weight value, the original HSV color coordinate comprises an original hue value, an original saturation value, and an original brightness value, the adjusted HSV color coordinate comprises an adjusted hue value, an adjusted saturation value, and an adjusted brightness value, and the color adjusting data, the original HSV color coordinate and the adjusted HSV color coordinate satisfy equations as follows:

$$H'=H+Wh;$$

$$S'=S\times Ws; \text{ and}$$

$$V'=V\times Wv,$$

wherein H is the original hue value, S is the original saturation value, and V is the original brightness value;

H' is the adjusted hue value, S' is the adjusted saturation value, and V' is the adjusted brightness value; and Wh is the hue weight value, Ws is the saturation weight value, and Wv is the brightness weight value; and wherein the corrected HSV color coordinate comprises a corrected hue value, a corrected saturation value, and a corrected brightness value, and the adjusted HSV color coordinate and the corrected HSV color coordinate satisfy equations as follows:

$$H''=(1-Sm)\times H+Sm\times H';$$

$$S''=(1-Sm)\times S+Sm\times S'; \text{ and}$$

$$V''=(1-Sm)\times V+Sm\times V',$$

wherein H" is the corrected hue value, S" is the corrected saturation value, and V" is the corrected brightness value; and Sm is a saturation parameter.

2. The method for adjusting the color of images according to claim 1, wherein the original image signal comprises an original red-green-blue (RGB) color model value, and obtaining the original HSV color coordinate comprises converting the original RGB color model value.

3. The method for adjusting the color of images according to claim 2, wherein a format of the original RGB color model value is a 24-bit format or a 48-bit format.

4. The method for adjusting the color of images according to claim 2, wherein the method for generating the output image signal comprises:

converting the corrected HSV color coordinate into an output RGB color model value.

5. The method for adjusting the color of images according to claim 4, wherein the format of the original RGB color model value is the same as a format of the output RGB color model value.

6. The method for adjusting the color of images according to claim 1, further comprises:

adjusting at least one monochrome parameter group, wherein the monochrome parameter group comprises a monochrome hue value, a monochrome saturation value, and a monochrome brightness value.

7. The method for adjusting the color of images according to claim 6, wherein a quantity of the monochrome parameter group is plural, and the method for generating the color adjusting data comprises:

adjusting a red hue value, a red saturation value, and a red brightness value;

adjusting a green hue value, a green saturation value, and a green brightness value; and adjusting a blue hue value, a blue saturation value, and a blue brightness value.

8. The method for adjusting the color of images according to claim 6, wherein a quantity of the monochrome parameter group is plural, and the method for generating the color adjusting data comprises:

adjusting a magenta hue value, a magenta saturation value, and a magenta brightness value;

adjusting a yellow hue value, a yellow saturation value, and a yellow brightness value; and adjusting a cyan hue value, a cyan saturation value, and a cyan brightness value.

9. The method for adjusting the color of images according to claim 1, wherein the corrected HSV color coordinate is converted from the adjusted HSV color coordinate according to the original saturation value.

10. The method for adjusting the color of images according to claim 1, wherein the saturation parameter satisfies an equation as follows:

$$Sm\times Bm=S, \text{ when } 0\leqq S<Bm,$$

wherein Bm is a first boundary value.

11. The method for adjusting the color of images according to claim 10, wherein the saturation parameter further satisfies an equation as follows:

$$Sm\times(BM-1)=S-1, \text{ when } BM<S\leqq 1,$$

wherein BM is a second boundary value.

12. The method for adjusting the color of images according to claim 11, wherein the second boundary value is greater than the first boundary value, and the saturation parameter further satisfies an equation as follows:

$$Sm=1, \text{ when } Bm\leqq S\leqq BM.$$

13. The method for adjusting the color of images according to claim 11, wherein the second boundary value is equal to the first boundary value.

* * * * *